United States Patent [19]

Fearing et al.

[11] 4,282,133

[45] Aug. 4, 1981

[54] FILLED UNSATURATED POLYESTER RESIN COMPOSITIONS

[75] Inventors: Ralph B. Fearing, Bardonia; Edward D. Weil, Hastings-on-Hudson, both of N.Y.

[73] Assignee: Stauffer Chemical Company, Westport, Conn.

[21] Appl. No.: 107,283

[22] Filed: Dec. 26, 1979

[51] Int. Cl.³ .............................................. C08K 5/36
[52] U.S. Cl. ........................... 260/30.6 R; 260/40 R; 260/45.7 PH
[58] Field of Search ......... 260/40 R, 30.6 R, 45.7 PH

[56] References Cited

U.S. PATENT DOCUMENTS

| | | | |
|---|---|---|---|
| 3,780,156 | 12/1973 | Cameron | 264/300 |
| 4,183,843 | 1/1980 | Koenig et al. | 260/40 R |

*Primary Examiner*—William F. Hamrock
*Attorney, Agent, or Firm*—Richard P. Fennelly

[57] ABSTRACT

The viscosity of filled unsaturated polyester resin compositions is reduced by the incorporation in said compositions of an effective amount of a composition comprising a lower alkoxylated alkyl acid phosphate ester.

7 Claims, No Drawings

FILLED UNSATURATED POLYESTER RESIN COMPOSITIONS

BACKGROUND OF THE INVENTION

1. Field of the Invention

The present invention relates to filled unsaturated polyester resin compositions having lowered viscosities so as to be more processable.

2. Description of the Prior Art

Filled unsaturated polyester resin compositions are well-known commercial products for the manufacture of a variety of products, for which either sheet metal or wood has traditionally been used. Some examples include auto bodies, wall panels and boat hulls. It has been customary to add filler to the polyester resin compositions to reduce the cost of the finished product, to improve the surface appearance of the product, and to improve its water resistance. However, addition of the levels of filler needed to accomplish these results also increases the viscosity of the filled polyester composition prior to cure rendering it more difficult to process. A number of prior art attempts have been made to decrease the viscosity of filled unsaturated polyester resin compositions by the use of additives to accomplish such a result.

U.S. Pat. No. 2,840,538 to H. F. Minter et al. advocates the use of: a melamine resin: a soap, such as aluminum or magnesium stearate; an oil, such as tall oil; or a fatty acid, such as stearic acid, as coatings for the filler material.

Canadian Pat. No. 776,764 advocates the use of a metal salt of an organic acid having from 3 to 18 carbon atoms as a viscosity reduction agent.

Japanese Kokai No. 75 70,493 advocates the use of polystyrene for viscosity reduction.

Kunststoffe 68(2), 62–64 (1978) mentions the testing of approximately one hundred substances as potential viscosity reduction aids in aluminum hydroxide-filled polyester resin systems. The majority of additives were judged to be ineffective for the intended results. Only a few additives were judged to be "fairly effective" including styrene, a surfactant (available as CEFAX-EMULGATOR), an ethoxylated alkylphenol (available as TINOVETIN NR), and triethyl phosphate.

SUMMARY OF THE PRESENT INVENTION

The present invention is a filled unsaturated polyester resin composition having a reduced viscosity which comprises a polyester resin, filler, and an effective amount of a composition comprising a lower alkoxylated alkyl acid phosphate ester for such viscosity reduction.

DESCRIPTION OF PREFERRED EMBODIMENTS OF THE PRESENT INVENTION

The present invention relates to resinous polyester molding compositions having reduced viscosity characteristics due to the presence of a composition comprising at least one lower alkoxylated alkyl acid phosphate ester.

The compositions of the present invention comprise any of the conventional polymerizable unsaturated polyester resins known to the art. These resins are prepared, for example, by the condensation reaction of an unsaturated polyhydric alcohol and a polycarboxylic acid, by the reaction of a saturated polyhydric alcohol with an unsaturated polycarboxylic acid, or by the reaction of combinations of unsaturated and saturated polyhydric alcohols with unsaturated and saturated polycarboxylic acids. Representative alcohols that can be used to make these resins include ethylene glycol, propylene glycol, diethylene glycol, dipropylene glycol, neopentyl glycol, dibromoneopentyl glycol, and the bis (2-hydroxyethyl)ether of tetrabromobisphenol-A. Representative acids include phthalic, adipic, tetrahydrophthalic, tetrachlorophthalic, tetrabromophthalic, chlorendic, maleic, fumaric, itaconic, succinic, isophthalic, terephthalic and trimellitic acids. These polyesters will generally also be mixed with one or more copolymerizable materials, such as those containing a vinyl group or isopropenyl group attached to an electronegative group such as phenyl (as in styrene), halogen (as in vinyl chloride), acetoxy (as in vinyl acetate), or carbalkoxy (as in ethyl acrylate or methyl methacrylate). The polyester resin (and optional comonomer(s), if any) is generally present in the composition at from about 90% to about 20%, by weight of the composition.

The fillers which are employed in the present invention include those finely divided (e.g., 20 microns or less in average particle size) materials conventionally used in polyester resin formulations of the type described. They include calcium carbonate, magnesium carbonate, hydrated alumina, silica, aluminum silicate, magnesium oxide, magnesium silicate, talc, iron oxide, diatomaceous earth, the hydrated silicates, mica, kaolin, and bentonite. The amount of filler can range from about 10% to about 80%, by weight of the total composition.

The polyester molding composition may also contain other conventional additives in conventional amounts in order to achieve the most desired properties for the composition. Representative examples include glass fibers, plasticizers, polymerization inhibitors, thickening agents, for example, delayed action thickening agents such as magnesia, and the like.

In order to achieve the desired viscosity reduction for the filled polyester compositions of the present invention when they are subjected to mixing during processing, the present invention contemplates the presence of an effective amount of a composition comprising a substantially neutral lower alkoxylated alkyl acid phosphate. The phosphate composition is advantageously used to pretreat the filler material prior to its addition to the polyester resin composition, although it can also be added to the filled polyester resin mixture. Such phosphate compositions can be formed by first reacting a suitable alkyl alcohol with phosphorus pentoxide, for example at a molar ratio of 2 to 1, to form a dialkyl acid pyrophosphate which can be hydrolyzed, for example, by an equimolar amount of water, to form an alkyl acid phosphate composition. This phosphate composition is then reacted with an appropriate lower alkylene oxide, such as ethylene oxide, for example, at a molar ratio of 1 to 3, to most commonly yield a mixture of a major amount (e.g., about 65% to 85%, by weight) of one or more lower alkoxylated alkyl acid phosphate esters in the presence of a minor amount (e.g., about 35% to about 15%, by weight) of alkoxylated phosphoric acid and some unreacted alkyl alcohol. This general type of reaction is described in U.S. Pat. No. 2,586,897 to W. H. Woodstock and in "Phosphorus and Its Compounds," John R. Van Wazer, ed., Vol. II, pp. 1227–1229 (Interscience Publishers, Inc., New York 1961).

The lower alkoxylated alkyl acid phosphate ester compound or compounds are of the following formula:

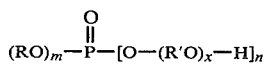

$$(RO)_m-\underset{\underset{O}{\|}}{P}-[O-(R'O)_x-H]_n$$

where x is an integer of from 1 to 5, m and n are either 1 or 2, with the sum of m and n being 3, R is a $C_1-C_{20}$ alkyl group, and R' is a $C_2-C_5$ alkylene group. A suitable composition of this type is available commercially as VICTAWET 12 from Stauffer Chemical Company (a mixture comprising about 10–25%, by weight, di(2-ethylhexyl) hydroxyethyl phosphate and about 50%–65%, by weight, of mono(2-ethylhexyl) hydroxyethyl polyoxyethylene phosphate). Generally, the amount of lower alkoxylated alkyl acid phosphate composition in the polyester composition will range from about 0.10% to about 5%, by weight of the filler.

The filled polyester compositions of the present invention have a reduced viscosity when subjected to mixing during processing as compared to a similar filled polyester composition which does not contain the above-described lower alkoxylated alkyl acid phosphate viscosity reduction additive.

After the polyester compositions of this invention have been suitably processed, they can be placed or sprayed onto an appropriate mold and used to form the intended final product. In order to initiate the polymerization of the unsaturated polyester resin (and any optional comonomers), a vinyl addition type polymerization catalyst (e.g., an azo, peroxide, hydroperoxide, perbenzoate, etc.) is incorporated into the composition, preferably just prior to the molding operation.

The present invention is illustrated by the following Examples.

EXAMPLES 1–12

These Examples illustrate the reduction in viscosity that is obtained by using the present invention (Examples 3, 4, 7, 8, 10 and 12) in systems containing a styrenated polyester resin and a calcium carbonate filler as compared to the analogous control runs (Examples 1, 2, 5, 6, 9 and 11).

Finely ground calcium carbonate filler (ATOMITE, sold by Thompson, Weinman and Company) was impregnated with a solution comprising a mixture of about 10–15%, by weight, of di(2-ethylhexyl) hydroxyethyl phosphate, about 60–65% by weight, of mono(2-ethylhexyl) hydroxyethyl polyoxyethylene phosphate, about 7–10% by weight, of 2-ethylhexanol, and about 12–17%, by weight, of oxyethylated phosphoric acid (VICTAWET 12, from Stauffer Chemical Company) in a methylene chloride solvent so that the percentage add-on of the mixture contained in the solvent was about 0.4%, by weight of the filler. The impregnation was accomplished by stirring the filler and solution until a uniform paste was formed and then drying of the paste to a powder.

The dry powder was then blended with three types of commercially available styrenated polyester resins so that the amount of treated filler in the polyester was either 150 or 200 parts by weight per 100 parts by weight of polyester resin. The viscosities (in centipoises) of the solutions were then determined on a Brookfield viscometer using Spindle No. 4 at various rotational speeds at 25° C. with the results given in the Table below as Example Nos. 3, 4, 7, 8, 10 and 12.

A similar control formulation was made with the exception that the filler was not treated with the phosphate ester solution. These runs are listed as Example Nos. 1, 2, 5, 6, 9 and 11.

TABLE 1

| Example No. | Polyester Type | Spindle Speed (rpm) | $CaCO_3$ (phr) | Viscosity (cps) |
|---|---|---|---|---|
| 1 (Control) | A | 12 | 150 | 44,200 |
| 2 (Control) | A | 6 | 150 | 39,000 |
| 3 | A | 12 | 150 | 33,000 |
| 4 | A | 6 | 150 | 29,000 |
| 5 (Control) | B | 12 | 200 | 18,500 |
| 6 (Control) | B | 6 | 200 | 16,900 |
| 7 | B | 12 | 200 | 12,000 |
| 8 | B | 6 | 200 | 11,800 |
| 9 (Control) | C | 12 | 150 | 28,000 |
| 10 | C | 12 | 150 | 18,000 |
| 11 (Control) | C | 6 | 150 | 30,000 |
| 12 | C | 6 | 150 | 21,700 |

Polyester resin type "A" is a commercially available polyester sold under the tradename KOPPERS 1010.
Polyester resin type "B" is a commercially available polyester sold under the tradename REICHHOLD 90-775.
Polyester resin type "C" is a commercially available polyester sold under the tradename PARAPLEX 19.

EXAMPLES 13 and 14

These Examples illustrate the reduction in viscosity that is obtained by using the present invention (Example 14) in a system containing a styrenated polyester resin and an alumina trihydrate filler as compared to a control run (Example 13).

In both Examples 13 and 14, the tested mixtures contained 40 grams of a commercially available styrenated unsaturated polyester resin (Type A from Example 1) and 70 grams of finely ground alumina trihydrate filler. The average viscosity over a ten minute period was measured on a Brookfield viscometer (spindle No. 7 at 10 rpm.) after the filler and polyester resin had been stirred for five minutes and allowed to age for fifteen minutes at 25° C. The filler used in Example 13 was untreated with any viscosity reduction additive. The filler used in Example 14 contained 1%, by weight of the filler, of the mixture used in Example 1.

TABLE 2

| Example | Average Viscosity (cps) | % Change |
|---|---|---|
| 13 (Control) | 80,000 | — |
| 14 | 59,600 | −25.5% |

EXAMPLES 15 and 16

These Examples illustrate the reduction in viscosity that is obtained by using the present invention (Example 16) in a system containing a styrenated polyester resin (PARAPLEX 19) and alumina trihydrate filler, as compared to a control run (Example 15) The same general procedure used in Examples 13–14 was employed with the exception that the mixture containing the hydroxyalkyl alkyl phosphate esters was used at 0.4%, by weight of the filler, rather than 1.0%, by weight, and the amount of filler was 120 parts by weight per hundred parts by weight of resin, rather than 175 phr as in Examples 13–14. The following viscosity data (in cps) was obtained with the percent reduction in viscosity shown in parenthesis:

| Brookfield Spindle Speed (rpm) | Example 15 (Control) | Example 16 (Invention) |
|---|---|---|
| 12 | 40,400 | 23,700 (−40.3%) |
| 30 | 35,000* | 17,600 (−49.7%) |

*at this speed the torque indicator was off the scale. The control is approximate as extrapolated from lower speed data. This resin exhibits thixotropy. At slower spindle speeds the viscosity increases, whereas at higher speeds it decreases.

EXAMPLE 17

This Example illustrates the formation of another embodiment of the viscosity reduction additive used in the filled unsaturated polyester resin compositions of the present invention.

Phosphorus pentoxide (38.5 g.) was added to methylene chloride (50 cc.) in a suitable reaction vessel equipped with a reflux condensor. To this mixture, while it was heated, was then slowly added tridecanol (113 gm.) followed by reflux of methylene chloride at a temperature of about 45° C. Additional phosphorus pentoxide (51 gm.) and tridecanol (135 gm.) were added and the mixture was again warmed until the solid phosphorus pentoxide disappeared. An additional charge of phosphorus pentoxide (63 gm.) and tridecanol (173 gm.) were added dropwise at 60° C. The total amount of phosphorus pentoxide added thus far was 152 gm. (1.07 moles), and the amount of tridecanol was 428 gm. (2.14 moles). The reaction mixture was allowed to reflux at 60°–70° C., and the methylene chloride was stripped to 85° C. under vacuum. The weight of the ditridecyl acid pyrophosphate product was 578.5 gm.

The ditridecyl acid pyrophosphate product was then reacted with a mixture of 15 gm. of water and 4 gm. of a 30%, by weight, solution of hydrogen peroxide at 65° C. The resulting product was a mixture of monotridecyl acid phosphate (about 0.572–0.587 mole fraction), ditridecyl acid phosphate (about 0.129–0.152 mole fraction) and phosphoric acid (0.232–0.24 mole fraction).

The mixture from the preceding reaction was extracted in 95 ml. of toluene by 100 cc of slightly salted water in a separatory funnel to remove phosphoric acid by-product. The organic layer was separated and then treated with a second water wash, including counter-wash by 100 cc. of toluene, and separation to complete removal of the phosphoric acid fraction. The separated organic layer contained a mixture of monotridecyl acid phosphate and ditridecyl acid phosphate. The toluene (about 520 ml.) and a small amount of water (about 30 cc.) was then stripped from the mixture to yield a mixture of about 75–78% of the monotridecyl acid phosphate, about 5–7% by weight of ditridecyl acid phosphate, with the remainder being unreacted tridecanol.

A portion of the above-described mixture (107 gm.) was then oxyethylated in a cooling bath with ethylene oxide at temperatures below about 50°–55° C. until no exothermic reaction was noted. The mixture was heated to continue reaction with ethylene oxide for about 5 hours at 50°–75° C. Excess ethylene oxide was then stripped to yield the product.

The phosphate composition comprised a mixture of di(tridecyl) hydroxyethyl phosphate and mono(tridecyl) hydroxyethyl polyoxyethylene phosphate.

EXAMPLES 18–19

These Examples illustrate use of the phosphate ester composition of Example 17 as a viscosity reduction additive.

A portion of the mixture from Example 17 (460 mg.) was dissolved in methylene chloride (40 ml.) and this was stirred with a commercially available calcium carbonate filler (115 gm.) from Thompson, Weinman and Company. The treated filler was then added to an unsaturated polyester resin (REICHHOLD 90-775) at 200 parts by weight of treated filler to 100 parts of resin. This formed Example 19 as noted below.

A control formulation was made as described above with the exception that the filler material was not treated with the methylene chloride solution containing the hydroxyethyl tridecyl phosphate ester of Example 17. This formed the basis for Example 18 as noted below.

The viscosities of the filler/polyester resin compositions of Examples 18 and 19 were measured at 25° C. on a Brookfield viscometer (Spindle No. 4) at different spindle rotation speeds as noted below with the data being the viscosity in centipoises.

| Example | SPINDLE ROTATION SPEED | | |
|---|---|---|---|
| | 30 rpm | 12 rpm | 6 rpm |
| 18 (Control) | >20,000 | 21,000 | 19,700 |
| 19 | 12,240 | 11,100 | 10,800 |

These data show the lower viscosity characteristics for the formulation (Example 19) containing the viscosity reduction additive described herein.

EXAMPLES 20–24

These data illustrate the viscosity characteristics of a number of alumina trihydrate-filled unsaturated polyester compositions at a variety of viscometer spindle rotational speeds.

Example 20 relates to a control formulation of 150 parts by weight of untreated alumina trihydrate in 100 parts by weight of unsaturated polyester resin (KOPPERS 1010-5).

Example 21 is analogous to Example 20 with respect to the level of filler and resin with the exception that the filler was treated with 0.4%, by weight, of the mixture containing the hydroxyalkyl alkyl phosphates used in Examples 3, 4, 7, 8, 10 and 12 (VICTAWET 12 from Stauffer Chemical Company).

Example 22 is similar to Example 21 with the exception that 40 gm. of the treated alumina trihydrate from Example 21 was mixed with untreated alumina trihydrate to give a level of 0.13 wt. % of the mixture based on the filler, rather than 0.4 wt. % as in Example 21.

Example 23 is similar to Example 22 with the exception that the 0.13 wt. % of the mixture was obtained by directly mixing 160 mg. of the mixture with 120 gm. of filler.

Example 24 is similar to Example 23 with the exception that the level of mixture of phosphates was at 0.044%, rather than 0.13%.

The viscosity of the samples was measured on a Brookfield viscometer (Spindle No. 4) at 25° C. with the following readings being obtained (in centipoises). No measurement was made for Example 23 at 3 rpm:

| Example No. | SPINDLE SPEED | |
|---|---|---|
| | 3 rpm | 6 rpm |
| 20 (Control) | 62,000 | 62,000 |
| 21 | 26,000 | 25,700 |
| 22 | 41,000 | 37,500 |
| 23 | — | 42,000 |
| 24 | 63,000 | 61,000 |

These data illustrate that at 0.4 wt. % and 0.13 wt. %, the mixture of hydroxyalkyl alkyl phosphates is effective at reducing the viscosity at all spindle speeds tested (Examples 21–23). The 0.044% level is not effective (Example 24) at the speeds that were tested.

The foregoing Examples illustrate certain embodiments of the present invention and should not therefore be construed in a limiting manner. The scope of protection that is sought is set forth in the claims which follow.

What is claimed:

1. A filled unsaturated polyester resin composition which comprises an unsaturated polyester resin, filler, and an effective amount of a substantially neutral lower alkoxylated alkyl acid phosphate composition for reduction of the viscosity of the composition wherein said alkyl acid phosphate contains a major amount of at least one compound of the formula

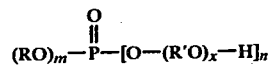

where x is an integer of from 1 to 5, m and n are either 1 or 2, with the sum of m and n being 3, R is a $C_1$–$C_{20}$ alkyl group and R' is a $C_2$–$C_5$ alkylene group.

2. A composition as claimed in claim 1 wherein the polyester resin is present at from about 90% to about 20%, by weight of the composition.

3. A composition as claimed in claim 1 wherein the filler is present at from about 10% to about 80%, by weight of the composition.

4. A composition as claimed in claim 3 wherein the filler is selected from the group consisting of calcium carbonate and hydrated alumina.

5. A composition as claimed in either claim 1, 2, 3, or 4 in which the phosphate composition is present at from about 0.10% to about 5%, by weight of the filler.

6. A composition as claimed in either claim 1, 2, 3, or 4 wherein the phosphate composition comprises a mixture of di(2-ethylhexyl) hydroxyethyl phosphate and mono(2-ethylhexyl) hydroxyethyl polyoxyethylene phosphate.

7. A composition as claimed in either claim 1, 2, 3 or 4 wherein the phosphate composition comprises a mixture of di(tridecyl) hydroxyethyl phosphate and mono(tridecyl) hydroxyethyl polyoxyethylene phosphate.

* * * * *